(12) United States Patent
Brouwers et al.

(10) Patent No.: US 10,286,400 B2
(45) Date of Patent: May 14, 2019

(54) REMOVABLE TIP FOR A DEMOLITION JAW (71) Applicant: Caterpillar Work Tools B.V., BJ s'Hertogenbosch (NL)

(72) Inventors: Jeroen Brouwers, NS Gemert (NL); John Van Gemert, BT Mill (NL); Henrie Dings, AR Maasdriel (NL)

(73) Assignee: Caterpillar Work Tools B.V., s-Hertogenbosch (NL)

( * ) Notice: Subject to any disclaimer, the term of this patent is extended or adjusted under 35 U.S.C. 154(b) by 278 days.

(21) Appl. No.: 15/213,819

(22) Filed: Jul. 19, 2016

(65) Prior Publication Data

US 2017/0022725 A1 Jan. 26, 2017

(30) Foreign Application Priority Data

Jul. 20, 2015 (EP) .................................. 15177578

(51) Int. Cl.
*B02C 1/02* (2006.01)
*B02C 1/10* (2006.01)
*E04G 23/08* (2006.01)
*E02F 9/28* (2006.01)
*B23D 17/00* (2006.01)
*B23D 35/00* (2006.01)
*E02F 3/96* (2006.01)

(52) U.S. Cl.
CPC .................. *B02C 1/02* (2013.01); *B02C 1/10* (2013.01); *B23D 17/00* (2013.01); *B23D 35/002* (2013.01); *E02F 3/965* (2013.01); *E02F 9/2825* (2013.01); *E04G 23/082* (2013.01); *B02C 2210/02* (2013.01); *B23D 35/001* (2013.01); *E02F 9/2833* (2013.01)

(58) Field of Classification Search
CPC .. B02C 1/02; B02C 1/10; E02F 9/2833; E02F 9/2825; E02F 9/2883; E02F 3/3677; E02F 3/3681
USPC .............. 241/264, 266, 101.73; 37/452–454; 414/732, 740; 294/197; 30/349
See application file for complete search history.

(56) References Cited

U.S. PATENT DOCUMENTS

| 2,707,343 | A | 5/1955 | Baer |
| 3,624,827 | A | 11/1971 | Liess et al. |
| 3,897,642 | A | 8/1975 | Helton et al. |
| 5,423,138 | A | 6/1995 | Livesay et al. |

(Continued)

FOREIGN PATENT DOCUMENTS

| EP | 0596285 | 5/1994 |
| EP | 1819881 | 2/2012 |
| WO | WO 2014/168611 | 10/2014 |

OTHER PUBLICATIONS

European Search Report dated Jan. 13, 2016.

*Primary Examiner* — Jessica Cahill
*Assistant Examiner* — Mohammed S. Alawadi (57) ABSTRACT

A replaceable tip for a demolition tool tip may include a first sidewall having a first contact side; a second sidewall having a second contact side; and a center wall connecting the first sidewall and the second sidewall. The center wall may have a third contact side provided with a recess, the recess may have first and second abutment surfaces, and the third contact side may have a third abutment surface adjacent the recess. A channel may be defined by the first, second and third contact sides, and the channel may be configured to receive an adapter of the demolition tool.

17 Claims, 8 Drawing Sheets

(56) References Cited

U.S. PATENT DOCUMENTS

| | | | |
|---|---|---|---|
| 5,561,925 A | 10/1996 | Livesay | |
| 5,709,043 A * | 1/1998 | Jones | E02F 9/2825 |
| | | | 37/458 |
| 5,778,570 A | 7/1998 | Eichelberger | |
| 5,782,019 A | 7/1998 | Launder et al. | |
| 6,837,649 B2 * | 1/2005 | Livesay | E02D 3/026 |
| | | | 37/454 |
| 7,730,651 B2 | 6/2010 | Carpenter | |
| 8,943,716 B2 | 2/2015 | Renski et al. | |
| 2004/0107608 A1 * | 6/2004 | Meyers | E02F 9/2825 |
| | | | 37/452 |
| 2007/0051022 A1 * | 3/2007 | Meyers | E02F 9/2825 |
| | | | 37/455 |
| 2011/0146469 A1 | 6/2011 | Purser | |
| 2012/0168543 A1 | 7/2012 | Ramun | |
| 2014/0231567 A1 * | 8/2014 | Van Gei | E02F 3/965 |
| | | | 241/300 |
| 2015/0197917 A1 | 7/2015 | Clemons | |

* cited by examiner

REMOVABLE TIP FOR A DEMOLITION JAW

CLAIM FOR PRIORITY

This application claims the benefit of priority under 35 U.S.C. § 119(a) of European Patent Application No. 15177578.0, filed Jul. 20, 2015, which is incorporated herein in its entirety by reference.

TECHNICAL FIELD

This disclosure relates to the field of demolition tools for crushing and/or cutting material and more particularly to the field of replaceable wear parts for demolition tools.

BACKGROUND

A demolition tool for crushing and/or cutting material is generally known. Typically, the demolition tool may comprise a jaw set having a lower jaw and an upper jaw. The upper and lower jaws may be pivotally connected. The upper and lower jaws may be moveable relative to each other. Cutting or crushing structures may be provided on both the upper jaw and the lower jaw. The work material may be crushed or cut by closing the upper jaw against the lower jaw under hydraulic pressure. The demolition tool may comprise a frame that connects the jaw set to a jib of a machine.

The demolition tool may have a jaw set that is suitable for crushing concrete. The jaw set may be adapted for crushing or cutting other materials, for example for cutting scrap iron and/or iron sections. The abrasive nature or hardness of some of these materials may cause the relatively rapid wear of the surfaces that engage the materials.

The demolition tool may be provided with replaceable wear parts that have wear surfaces. The wear part may be connected directly to the jaw set by conventional techniques. The wear pack may be provided on the upper and/or the lower jaw. The wear pack may be retained by fasteners that are exposed to relatively high stresses during operation.

U.S. Pat. No. 3,624,827A, assigned to Caterpillar Tractor Co, discloses an earthworking tip suitable for mounting on an adapter which is wedge-shaped in vertical cross section. The tip defines a rearwardly facing V-shaped projection which mates with a V-shaped opening in the adapter to transfer loads from the tip to the adapter. The tip has rearwardly extending upper and lower flanges to generally mate with the wedge-shaped adapter. Retaining means secure the tip upon the adapter.

The present disclosure is directed, at least in part, to improving or overcoming one or more aspects of the prior art system.

SUMMARY

In a first aspect, the present disclosure describes a replaceable tip for a demolition tool. The replaceable tip may comprise: a first sidewall having a first contact side; a second sidewall having a second contact side; and a center wall connecting the first sidewall and the second sidewall, the center wall having a third contact side provided with a recess, the recess having first and second abutment surfaces and the third contact side having a third abutment surface adjacent the recess; and a channel defined by the first, second and third contact sides, the channel being configured to receive an adapter of the demolition tool.

In a second aspect, the present disclosure describes a method of reducing wear on an adapter mounted to a demolition tool. The method comprising the steps of: providing a replaceable tip; coupling the replaceable tip to the adapter comprising a body having a central side, the central side having first, second and third engagement surfaces wherein the central side extends longitudinally from a base to an apex, wherein the first abutment surface contacts the first engagement surface; and closing jaws of the demolition tool to crush work material such that the resultant demolition force is directed to the adapter in a direction perpendicular to the first abutment surface.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figures 1, 2, 3:
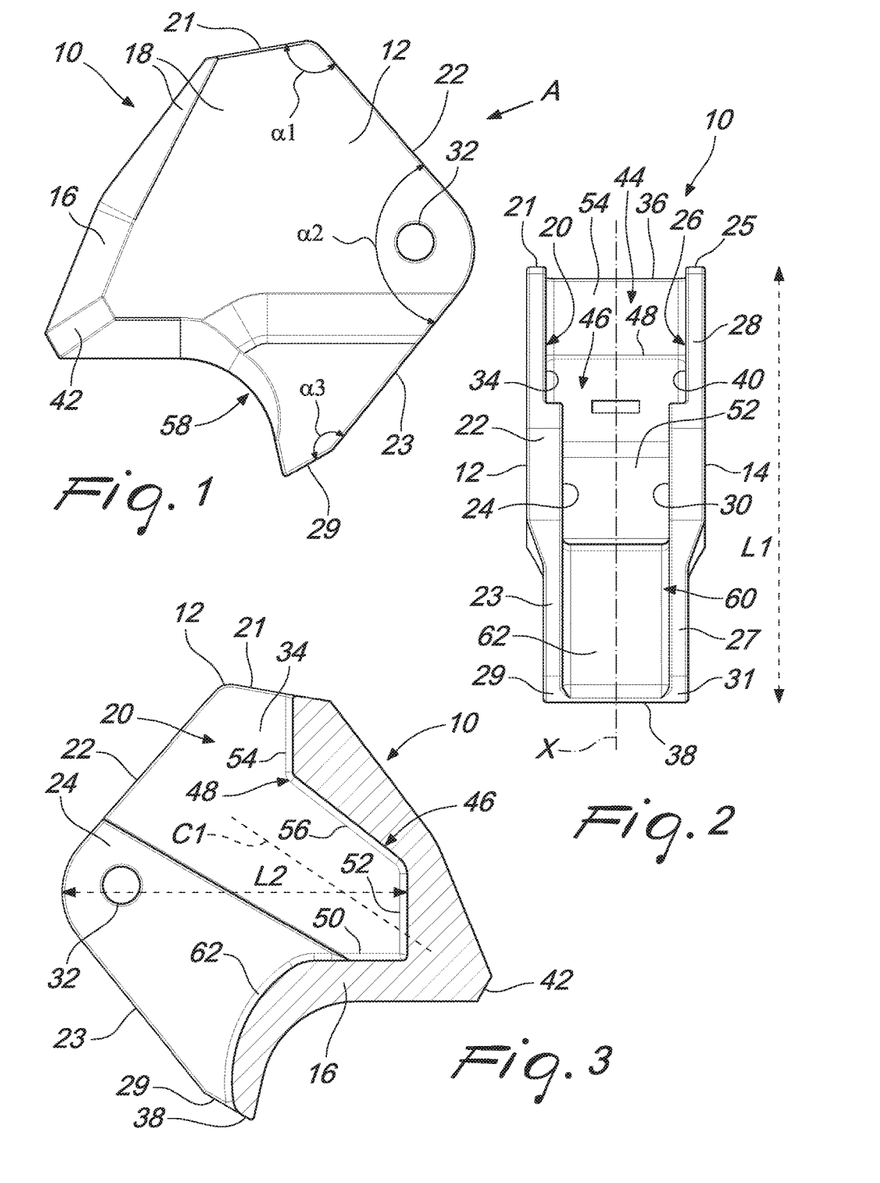
FIG. 1 is an isometric view of a replaceable tip according to the present disclosure.
FIG. 2 is a view of the replaceable tip of FIG. 1 from direction A.
FIG. 3 is a sectional view of the replaceable tip of FIG. 1.

This disclosure generally relates to a replaceable tip for assembly onto a demolition tool. FIGS. 1 and 2 illustrate the replaceable tip 10 for a demolition tool (not shown). The replaceable tip 10 may comprise a first sidewall 12 and a second sidewall 14. Replaceable tip 10 may have a center wall 16. Center wall 16 may connect the first sidewall 12 to the second sidewall 14. The first sidewall 12, second sidewall 14 and center wall 16 may be formed as a monolithic body. In an embodiment, first sidewall 12, second sidewall 14 and center wall 16 may be separately formed structures that are joined together to form the replaceable tip 10.

Replaceable tip 10 may comprise a wear surface 18 that extends along the surfaces of the first sidewall 12, the second sidewall 14 and the center wall 16. Wear surface 18 may be the outer surface of replaceable tip 10 that contacts material during work operations.

One or more hoist loops (not shown) may be positioned on the wear surface 18 to enable ease of handling by a hoist during attachment and removal operations of the replaceable tip 10.

With reference to FIG. 2, the first sidewall 12 may have a first contact side 20 of the replaceable tip 10. First contact side 20 may be on the side of the first sidewall 12 opposite to the side with the wear surface 18. First contact side 20 may contact a portion of the adapter (not shown).

First sidewall 12 may comprise a first edge 22. First edge 22 may be bounded by a first end 21 and a first hem 23. First hem 23 may be joined to a first inclined end 29 which is slanted relative to the first hem 23. First end 21 and first inclined end 29 may be connected to opposite ends of the center wall 16. First end 21 may extend from the first edge 22 to the center wall 16. First inclined end 29 may extend from the first hem 23 to the center wall 16.

First end 21 may inclined by an angle $\alpha_1$. In an embodiment, first end 21 may inclined by an angle $\alpha_1$ of 121 to 122 degrees from first edge 22. In a further embodiment, angle $\alpha_1$ may be 121.2 degrees. First edge 22 may inclined by an angle $\alpha_2$. In an embodiment, first edge 22 may inclined by an angle $\alpha_2$ of 99 to 100 degrees from first hem 23. In a further embodiment, angle $\alpha_2$ may be 99.9 degrees. First hem 23 may inclined by an angle $\alpha_3$. In an embodiment, first hem 23 may inclined by an angle $\alpha_3$ of 158 to 159 degrees from first inclined end 29. In a further embodiment, angle $\alpha_3$ may be 158.9 degrees.

With reference to FIGS. 2 and 3, first contact side 20 may comprise split levels. First contact side 20 may comprise a first step-up portion 24 and a first step-down portion 34. First step-up portion 24 may be contiguous with first step-down portion 34. First step-up portion 24 may extend substantially transversely across the first contact side 20. First step-down portion 34 may extend substantially transversely across the first contact side 20. First step-up portion 24 may extend from the first edge 22 into the replaceable tip 10 towards the center wall 16. First step-down portion 34 may extend from the first edge 22 into the replaceable tip 10 towards the center wall 16.

First step-up portion 24 may extend substantially longitudinally along the first contact side 20. First step-up portion 24 may extend substantially longitudinally to the first hem 23. First step-up portion 24 may extend in a direction away from the first end 21 to the first hem 23. First step-up portion 24 may extend substantially longitudinally from the first step-down portion 34 to the first hem 23. First step-down portion 34 may extend substantially longitudinally along the first contact side 20. First step-down portion 34 may extend longitudinally to the first end 21. First step-down portion 34 may extend in a direction away from the first hem 23 to the first end 21. First step-down portion 34 may extend substantially longitudinally from the first step-up portion 24 to the first end 21.

First sidewall 12 may have a plate-like structure. First sidewall 12 may have a length L1. In an embodiment, first sidewall 12 may have a length L1 ranging from 434 mm to 435 mm. In a further embodiment, first sidewall 12 may have a length L1 of 434.9 mm. With reference to FIG. 3, first sidewall 12 may have a width L2. In an embodiment, first sidewall 12 may have a width L2 ranging from 361 mm to 363 mm. In a further embodiment, first sidewall 12 may have a width L2 of 362 mm.

With reference to FIG. 2, the second sidewall 14 may have a second contact side 26 of the replaceable tip 10. Second contact side 26 may be on the side of the second sidewall 14 opposite to the side with the wear surface 18. Second contact side 26 may contact a portion of the adapter (not shown).

Second sidewall 14 may comprise a second edge 28. Second edge 28 may be bounded by a second end 25 and a second hem 27. Second hem 27 may be joined to a second inclined end 31 which is slanted relative to the second hem 27. Second end 25 and second inclined end 31 may be connected to opposite ends of the center wall 16. Second end 25 may extend from the second edge 28 to the center wall 16. Second inclined end 31 may extend from the second hem 27 to the center wall 16.

Second end 25 may inclined by an angle $\alpha_1$. In an embodiment, second end 25 may inclined by an angle $\alpha_1$ of 121 to 122 degrees from second edge 28. In a further embodiment, angle $\alpha_1$ may be 121.2 degrees. Second edge 28 may inclined by an angle $\alpha_2$. In an embodiment, second edge 28 may inclined by an angle $\alpha_2$ of 99 to 100 degrees from second hem 27. In a further embodiment, angle $\alpha_2$ may be 99.9 degrees. Second hem 27 may inclined by an angle $\alpha_3$. In an embodiment, second hem 27 may inclined by an angle $\alpha_3$ of 158 to 159 degrees from second inclined end 31. In a further embodiment, angle $\alpha_3$ may be 158.9 degrees.

Second contact side 26 may comprise a split-level. Second contact side 26 may comprise a second step-up portion 30 and a second step-down portion 40. Second step-up portion 30 may be contiguous with second step-down portion 40. Second step-up portion 30 may extend substantially transversely across the second contact side 26. Second step-down portion 40 may extend substantially transversely across the second contact side 26. Second step-up portion 30 may extend from the second edge 28 into the replaceable tip 10 towards the center wall 16. Second step-down portion 40 may extend from the second edge 28 into the replaceable tip 10 towards the center wall 16.

Second step-up portion 30 may extend substantially longitudinally along the second contact side 26. Second step-up portion 30 may extend substantially longitudinally to the second hem 27 and second inclined end 31. Second step-up portion 30 may extend in a direction away from the second end 25 to the second hem 27. Second step-up portion 30 may extend substantially longitudinally from the second step-down portion 40 to the second hem 27 and second inclined end 31. Second step-down portion 40 may extend substantially longitudinally to the second end 25. Second step-down portion 40 may extend in a direction away from the second inclined end 31 to the second end 25. Second step-down portion 40 may extend substantially longitudinally from the second step-up portion 30 to the second end 25.

Second sidewall 14 may have a plate-like structure. Second sidewall 14 may have a length L1 ranging from 434 mm to 435 mm. Second sidewall 14 may have a length L1 of 434.9 mm. With reference to FIG. 3, second sidewall 14 may have a width L2 ranging from 361 mm to 363 mm. Second sidewall 14 may have a width L2 of 362 mm.

First sidewall 12 may be substantially parallel to the second sidewall 14. First contact side 20 may be substantially parallel to the second contact side 26. First and second step-up portions 24, 30 may be correspondingly positioned on the respective first and second contact sides 20, 26 along the replaceable tip 10. First and second step-down portions 34, 40 may be correspondingly positioned on the respective first and second contact sides 20, 26 along the replaceable tip 10. The straight-line distance between the first and second contact sides 20, 26 may be the lowest at the first and second step-up portions 24, 30.

First sidewall 12 and second sidewall 14 may be provided with securing portions 32. Securing portions 32 may be positioned on the first and second step-up portions 24, 30. Respective securing portions 32 may be correspondingly positioned on the replaceable tip 10. In an embodiment, the securing portion 32 may be a through hole extending through the respective first sidewall 12 and second sidewall 14. The central axis of the respective securing portion 32 may be mutually aligned.

The center wall 16 may connect the first sidewall 12 to the second sidewall 14. First sidewall 12 may be substantially perpendicular to the center wall 16. Second sidewall 14 may be substantially perpendicular to the center wall 16. First sidewall 12 and the second sidewall 14 may be connected to opposite sides of the center wall 16. First sidewall 12 and the second sidewall 14 may be connected to opposite longitudinal edges of the center wall 16.

Center wall 16 may have a first transverse edge 36 and a second transverse edge 38. First transverse edge 36 may be connected between the first end 21 of the first sidewall 12 and the second end 25 of the second sidewall 14. Second transverse edge 38 may be connected between the first inclined end 29 of the first sidewall 12 and the second inclined end 31 of the second sidewall 14.

Center wall 16 may have a crushing point 42. Crushing point 42 may form part of the wear surface 18 of the replaceable tip 10. Crushing point 42 may impact material to be crushed during demolition operations. Crushing point 42 may extend from the center wall 16 away from the securing portion 32. Crushing point 42 may be extended from the center wall 16 away from the first and second edges 22, 28. Crushing point 42 may be extended substantially transversely across the replaceable tip 10. Crushing point 42 may extend substantially transversely from the center wall 16 away from the securing portion 32. Crushing point 42 may extend substantially transversely from the center wall 16 away from the first and second edges 22, 28.

In an embodiment, crushing point 42 may be planar. Crushing point 42 may extend substantially transversely across the center wall 16. Planar crushing point 42 may be substantially perpendicular to the first and second contact sides 20, 26.

Center wall 16 may have a third contact side 44. Third contact side 44 may be on the side of the center wall 16 opposite to the side with the wear surface 18. Third contact side 44 may contact a portion of the adapter (not shown). Third contact side 44 may be positioned between the first and second contact sides 20, 26. Third contact side 44 may be substantially perpendicular to the first and second contact sides 20, 26.

Third contact side 44 may be provided with a recess 46. Recess 46 may have an opening 48 on the third contact side 44. The opening 48 may provide access into the recess 46. Recess 46 may extend into the center wall 16. Recess 46 may extend into the center wall 16 towards the wear surface 18. Recess 46 may extend into the center wall 16 towards the crushing point 42.

Recess 46 may be positioned between the first and second contact sides 20, 26. The first and second contact sides 20, 26 may border the recess 46 on opposite sides. Opening 48 may extend transversely across the third contact side 44 between the first and second contact sides 20, 26.

First step-down portion 34 may extend into the recess 46. On the opposite side, second step-down portion 40 may extend into the recess 46. Recess 46 may have a central plane C1 that is substantially parallel to the first and second contact sides 20, 26. In an embodiment, central plane C1 may be parallel to the borders between the first and second step-up portions 24, 30 and the first and second step-down portions 34, 40.

With reference to FIG. 3, the recess 46 may have a first abutment surface 50 of the replaceable tip 10. The first abutment surface 50 may be in constant contact with a portion of the adapter (not shown). First abutment surface 50 may be in force engagement with the adapter during crushing operation of the demolition tool. Forces created by the demolition operation may be transferred to the adapter through the first abutment surface 50 when the first abutment surface 50 is in force engagement with the adapter.

The first abutment surface 50 may have a suitable dimension and shape to be in force engagement with the adapter. In an embodiment, the first abutment surface 50 may be rectangular in shape 50. In an embodiment, first abutment surface 50 may have a length of 130 mm to 133 mm. First abutment surface 50 may have a length of 131 mm. In an embodiment, first abutment surface 50 may have a width of 50 mm to 53 mm. First abutment surface 50 may have a length of 51.9 mm. First abutment surface 50 may be orientated such that the longer sides corresponding to the length may be parallel to the third contact side 44 and the shorter sides corresponding to the width may be parallel to the first and second contact sides 20, 26.

In a further embodiment, the first abutment surface 50 may have a portion of a longer side being protruded. The protruded side may be joined to the first abutment surface 50 through the portions of the side that are convexly curved. The protruded side may be centrally positioned relative to the rest of the first abutment surface 50. The protruded side may be equidistant from the shorter sides.

The protruded side may be remote from the third contact surface 44 and adjacent to the opening 48. The protruded side may be parallel the third contact surface 44 and perpendicular to the first contact side 20 and to the second contact side 26. The protruded side may have a length of 95 mm to 97 mm. The protruded side may have a length of 96 mm. The distance between the protruded side and the parallel longer side may be 91 mm to 97 mm. The distance between the protruded side and the parallel longer side may be 92.2 mm.

First abutment surface 50 may be adjacent to opening 48 of the recess 46. Opening 48 may border an edge of the abutment surface 50. First abutment surface 50 may extend from the opening 48 into the center wall 16. First abutment surface 50 may be inclined relative to the central plane C1. First abutment surface 50 may be positioned between the first contact side 20 and the second contact side 26. First abutment surface 50 may be substantially perpendicular to the first contact side 20 and to the second contact side 26.

The recess 46 may have a second abutment surface 52 of the replaceable tip 10. The second abutment surface 52 may abut a portion of the adapter (not shown) during crushing operation of the demolition tool. In an embodiment, second abutment surface 52 may be in force engagement during crushing operation of the demolition tool. Forces created by the demolition operation may be transferred to the adapter through the second abutment surface 52 when the second abutment surface 52 is in force engagement with the adapter.

The second abutment surface 52 may have a suitable dimension and shape to be in force engagement with the adapter. In an embodiment, second abutment surface 52 may be rectangular in shape. In an embodiment, second abutment surface 52 may have a length of 130 mm to 133 mm. Second abutment surface 52 may have a length of 131 mm. In an embodiment, second abutment surface 52 may have a width of 85 mm to 87 mm. Second abutment surface 52 may have a length of 86 mm. Second abutment surface 52 may be orientated such that the longer sides corresponding to the length may be parallel to the third contact side 44 and the shorter sides corresponding to the width may be parallel to the first and second contact sides 20, 26.

Second abutment surface 52 may be opposite to opening 48 of the recess 46. Second abutment surface 52 may be spaced from the opening 48. The first abutment surface 50 may be adjacent to the second abutment surface 52. First abutment surface 50 may extend from the opening 48 to the second abutment surface 52. Second abutment surface 52 may be inclined to the first abutment surface 50. First abutment surface 50 may be substantially perpendicular to the second abutment surface 52. First abutment surface 50 may have the same width as the second abutment surface 52.

Second abutment surface 52 may be inclined relative to the central plane C1. In an embodiment, the central plane C1 may intersect the second abutment surface 52. Second abutment surface 52 may be positioned between the first contact side 20 and the second contact side 26. Second abutment surface 52 may be substantially perpendicular to the first contact side 20 and to the second contact side 26.

In an embodiment, first and second abutment surfaces 50, 52 may act to direct a resultant demolition force through the replaceable tip 10 to the adapter (not shown). The first and second abutment surfaces 50, 52 may act to direct a resultant demolition force through the replaceable tip 10 to the adapter when both the first and second abutment surfaces 50, 52 are in force engagement with the adapter. The first and second abutment surfaces 50, 52 may be in force engagement with the adapter when the replaceable tool 10 is subject to demolition forces.

First and second abutment surfaces 50, 52 may direct the resultant demolition force through the replaceable tip 10 to the adapter (not shown) in a direction substantially perpendicular to the first abutment surface 50. The resultant demolition force may be directed substantially perpendicular to the first abutment surface 50 with the demolition tool (not shown) at initiation of a demolition operation with the jaws (not shown) fully open. The jaws may contain material to be crushed.

A demolition force may be a force that is produced by a work machine. The demolition force may be directed through the replaceable tip 10 to the material to be crushed. The demolition tool (not shown) may have a cylinder to open and close the jaws. In an embodiment, the demolition force may be a force produced by the demolition tool cylinder when the jaws are actuated to close.

The demolition tool may be connected to a machine arm (not shown) having a further cylinder. In an alternative embodiment, the demolition force may further include the force generated by a bucket cylinder. The replaceable tip 10 may direct the resultant force substantially perpendicular to the first abutment surface 50.

A resultant demolition force may be the force produced on the replaceable tip 10. In an embodiment, the resultant demolition force may arise from the demolition force produced by the cylinder in the demolition. In an alternative embodiment, the resultant demolition force may arise from the demolition force produced by the cylinder in the demolition tool and the cylinder in the machine arm.

The resultant demolition force may be produced at the time the jaws move from a fully opened position to a closed position. The resultant demolition force may be produced with jaws containing material to be crushed.

Replaceable tip 10 may have a third abutment surface 54. The third abutment surface 54 may abut a portion of the adapter (not shown) during crushing operation of the demolition tool. In an embodiment, third abutment surface 54 may be in force engagement during crushing operation of the demolition tool. Forces created by the demolition operation may be transferred to the adapter through the third abutment surface 54 when the third abutment surface 54 is in force engagement with the adapter.

Third abutment surface 54 may be provided on the third contact side 44. Third abutment surface 54 may be adjacent to the recess 46. Third abutment surface 54 may be adjacent to the opening 48 of the recess 46. Third abutment surface 54 may extend from the first transverse edge 36 to the recess 46. Third abutment surface 54 may extend from the first transverse edge 36 to the opening 48. Third abutment surface 54 may be inclined to the first abutment surface 50. Third abutment surface 54 may be perpendicular to the first abutment surface 50. Third abutment surface 54 may be parallel to the second abutment surface 52.

The third abutment surface 54 may have a suitable dimension and shape to be in force engagement with the adapter. In an embodiment, third abutment surface 54 may be rectangular in shape. In an embodiment, third abutment surface 54 may have a length of 130 mm to 133 mm. Third abutment surface 54 may have a length of 131 mm. In an embodiment, third abutment surface 54 may have a width of 75 mm to 79 mm. Third abutment surface 54 may have a length of 77.4 mm. Third abutment surface 54 may be orientated such that the longer sides corresponding to the length may be parallel to the third contact side 44 and the shorter sides corresponding to the width may be parallel to the first and second contact sides 20, 26.

Third abutment surface 54 may be inclined relative to the central plane C1. Third abutment surface 54 may be positioned between the first contact side 20 and the second contact side 26. Third abutment surface 54 may be substantially perpendicular to the first contact side 20 and to the second contact side 26. Third abutment surface 54 may have the same width as the second abutment surface 52.

In an embodiment, first and third abutment surfaces 50, 54 may act to direct the demolition forces through the replaceable tip 10 to the adapter (not shown). The first and third abutment surfaces 50, 54 may act to direct a resultant demolition force through the replaceable tip 10 to the adapter when both the first and third abutment surfaces 50, 54 are in force engagement with the adapter. The first and third abutment surfaces 50, 54 may be in force engagement with the adapter when the replaceable tool 10 is subjection to demolition forces.

First and third abutment surfaces 50, 54 may direct the demolition forces through the replaceable tip 10 to the adapter (not shown) in a direction substantially perpendicular to the first abutment surface 50. The demolition forces may be directed substantially perpendicular to the first abutment surface 50 with the demolition tool (not shown) at initiation of a demolition operation with the jaws (not shown) fully open. The jaws may contain material to be crushed.

The combination of the first and third abutment surfaces 50, 54 may act alternatively to the combination of first and second abutment surfaces 50, 52 to direct the demolition forces through the replaceable tip 10 to the adapter (not shown).

The recess 46 may have a non-contact surface 56 connecting the second abutment surface 52 to the third abutment surface 54. Non-contact surface 56 may be opposite to the first abutment surface 50. Non-contact surface 56 may be adjacent to opening 48 of the recess 46. Opening 48 may border an edge of the non-contact surface 56.

Non-contact surface 56 may extend from the opening 48 into the center wall 16. The non-contact surface 56 may be joined to the third abutment surface 54. The non-contact surface 56 may be joined to the third abutment surface 54 at the edge bordering the opening 48.

Non-contact surface 56 may be substantially parallel relative to the central plane C1. Non-contact surface 56 may be positioned between the first contact side 20 and the second contact side 26. Non-contact surface 56 may be substantially perpendicular to the first contact side 20 and to the second contact side 26.

Center wall 16 may have a curved portion 58. Curved portion 58 may connect the recess 46 to an end of the replaceable tip 10. Curved portion 58 may be positioned between the recess 46 and the second transverse edge 38.

Curved portion 58 may have a curved surface 62 on the curved portion 58 of the center wall 16. Curved surface 62 may be positioned between the first abutment surface 50 and the second transverse edge 38. Curved surface 62 may be positioned between the first contact side 20 and the second contact side 26. Curved surface 62 may be substantially perpendicular to the first contact side 20 and to the second contact side 26.

Replaceable tip 10 may have a channel 60. The channel 60 may be defined by the first, second and third contact sides 20, 26, 44. The channel 60 may be configured to receive the adapter (not shown) of the demolition tool. Channel 60 may be formed on the replaceable tip 10 interiorly relative to the external wear surface 18. Recess 46 may be assessable from the channel 60. Recess 46 communicates with the channel 60 through the opening 48.

The channel 60 may have a substantially U shaped cross section. Channel 60 may have a width suitable for receiving the adapter. In an embodiment, channel 60 may have a width ranging from 142 mm to 152 mm between the first and second contact sides 20, 26. In an embodiment, channel 60 may have a width of 147 mm.

Channel 60 may have a longitudinal axis X. The first, second and third abutment surfaces 50, 52, 54 may be mutually aligned along the longitudinal axis X. The first, second and third abutment surfaces 50, 52, 54 may be mutually aligned linearly along the longitudinal axis X. The respective longitudinal axes of the first, second and third abutment surfaces 50, 52, 54 may be parallel to the longitudinal axis X. The respective longitudinal axes of the first, second and third abutment surfaces 50, 52, 54 may be aligned to the longitudinal axis X.

Figures 4, 5, 6:
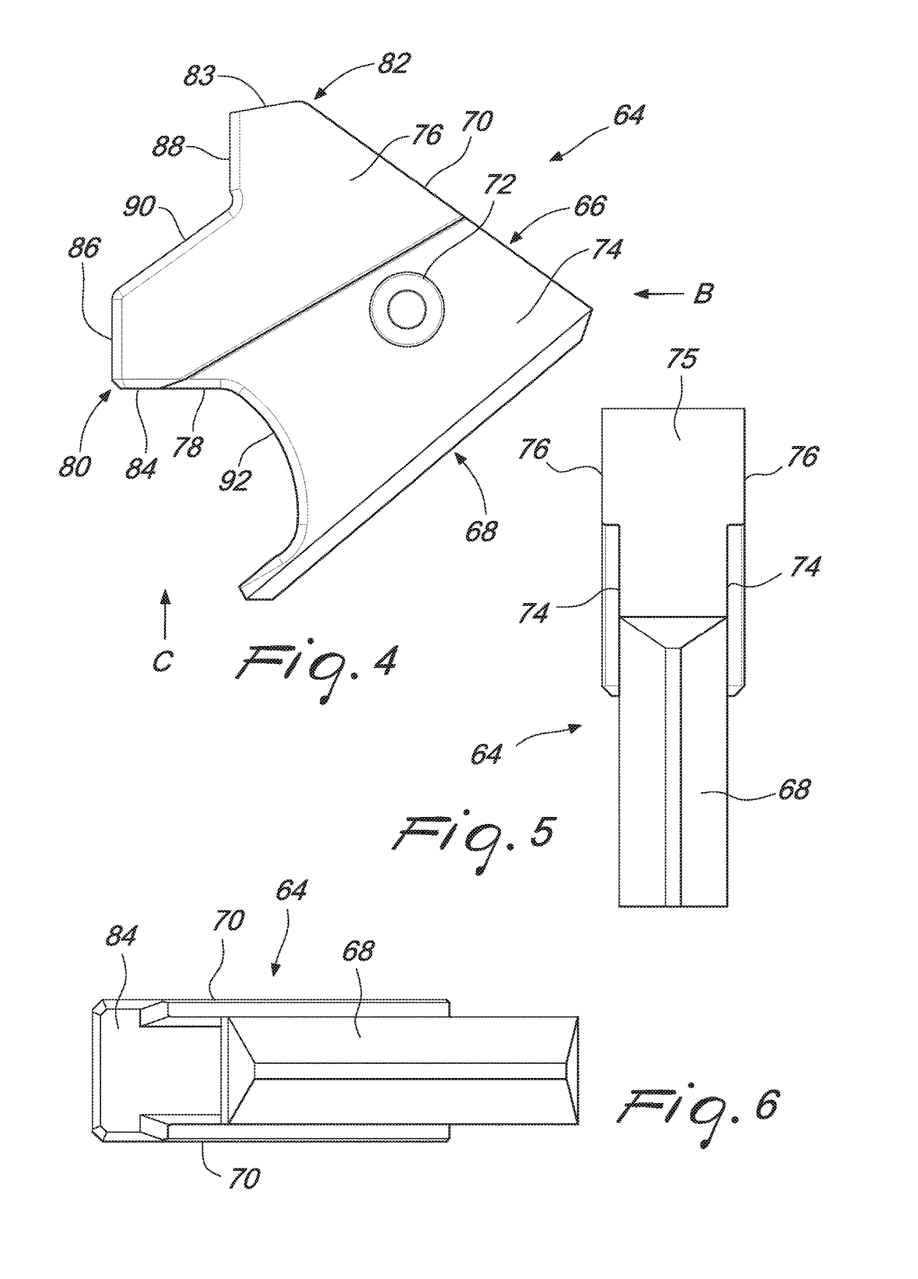
FIG. 4 is an isometric view of an adapter of a demolition tool according to the present disclosure.
FIG. 5 is a view of the adapter of FIG. 3 from direction B.
FIG. 6 is a view of the adapter of FIG. 3 from direction C.

FIG. 4 illustrates an adapter 64. The adapter 64 may comprise a body 66. The body 66 may have a base 68 for connection to a demolition tool (not shown). In an embodiment, the adapter 64 may be preformed and subsequently joined to a jaw of the demolition tool. In an alternative embodiment, the adapter 64 may be formed monolithically with the jaw of the demolition tool.

Body 66 may have support sides 70. Support sides 70 may be parallel. Support sides 70 may contact the first and second contact sides 20, 26 of the replaceable tip 10. Support sides 70 may have a reciprocal securing portion 72. Respective reciprocal securing portions 72 may be correspondingly positioned on the replaceable tip 10. In an embodiment, the reciprocal securing portion 72 may be a through hole extending through the body 66. Openings of the through hole may be formed on the support sides 70.

Each support side 70 may comprise split-levels. Each support side 70 may comprise a reciprocal step-down portion 74 and a reciprocal step-up portion 76. Reciprocal step-up portion 76 may be contiguous with reciprocal step-down portion 74. Reciprocal step-down portion 74 may extend substantially transversely across each support side 70. Reciprocal step-up portion 76 may extend substantially transversely across each support side 70. Reciprocal securing portion 72 may be positioned on the reciprocal step-down portions 74.

Reciprocal step-up portions 76 on the support sides 70 may be mutually corresponding. Reciprocal step-up portions 76 on the support sides 70 may have corresponding shape and dimension. Reciprocal step-up portions 76 may fit within the first and second step-down portions 34, 40 on the first and second contact sides 20, 26.

Reciprocal step-down portions 74 on the support sides 70 may be mutually corresponding. Reciprocal step-down portions 74 on the support sides 70 may have corresponding shape and dimension. Reciprocal step-down portions 74 may receive the first and second step-up portions 24, 30 on the first and second contact sides 20, 26.

Adapter 64 may have a central side 78. Central side 78 may contact the third contact side 44. Central side 78 may be positioned between the support sides 70. Central side 78 may be substantially perpendicular to the support sides 70.

Adapter 64 may have a projection 80. Projection 80 may extend substantially transversally from body 66. Projection 80 may extend from body 66 in a direction substantially perpendicular to the central side 78. The reciprocal step-up portions 76 may extend along the sides of the projection 80.

Adapter 64 may have a shoulder 82. Shoulder 82 may extend substantially longitudinally from body 66. Shoulder 82 may extend from body 66 in a direction substantially perpendicular to the base 68. The reciprocal step-up portions 76 may extend along the sides of the shoulder 82. The adapter 64 may have an apex 83 on the shoulder. The central side 78 may extend from the base 68 to the apex 83.

The projection 80 may have a first engagement surface 84 on the central side 78. The first engagement surface 84 may be in constant contact with the first abutment surface 50 of the replaceable tip 10. Forces created by the demolition operation may be transferred to the adapter 64 from first abutment surface 50 to the first engagement surface 84. First engagement surface 84 may be positioned between the support sides 70. First engagement surface 84 may be substantially perpendicular to the support sides 70.

The projection 80 may have a second engagement surface 86 on the central side 78. The second engagement surface 86 may abut the second abutment surface 52 of the replaceable tip 10 during crushing operation of the demolition tool. Forces created by the demolition operation may be transferred to the adapter 64 from the second abutment surface 52 to the second engagement surface 86. Second engagement surface 86 may be positioned between the support sides 70. Second engagement surface 86 may be substantially perpendicular to the support sides 70.

First engagement surface 84 may be adjacent to the second engagement surface 86. First engagement surface 84 may be connected to the second engagement surface 86. First engagement surface 84 may be inclined to the second engagement surface 86. First engagement surface 84 may be perpendicular to the second engagement surface 86.

The projection 80 may have a third engagement surface 88 on the central side 78. The third engagement surface 88 may abut the third abutment surface 54 of the replaceable tip 10 during crushing operation of the demolition tool. Forces created by the demolition operation may be transferred to the adapter 64 from the third abutment surface 54 to the third engagement surface 88.

Third engagement surface 88 may be provided on the shoulder 82. Third engagement surface 88 may be adjacent to the projection 80. Third engagement surface 88 may extend from the projection 80. Third engagement surface 88 may be inclined to the first engagement surface 84. Third engagement surface 88 may be perpendicular to the first engagement surface 84. Third engagement surface 88 may be parallel to the second engagement surface 86.

Third engagement surface 88 may be positioned between the support sides 70. Third engagement surface 88 may be substantially perpendicular to the support sides 70. Third engagement surface 88 may have the same width as the second engagement surface 86.

The projection 80 may have a reciprocal non-contact surface 90. Reciprocal non-contact surface 90 may connect the projection 80 to the shoulder 82. Reciprocal non-contact surface 90 may connect the second engagement surface 86 to the third engagement surface 88. Reciprocal non-contact surface 90 may be opposite the first engagement surface 84 on the projection. Reciprocal non-contact surface 90 may be positioned between the support sides 70. Reciprocal non-contact surface 90 may be substantially perpendicular to the support sides 70.

Body 66 may have a curved section 92. Curved section 92 may connect the projection 80 to the base 68. Central side 78 may extend on the curved section 92. The curved portion 58 may extend over the curved section 92.

The adapter 64 may receive a resultant demolition force through the replaceable tip 10 in a direction substantially perpendicular to the first engagement surface 84. The resultant demolition force may be directed substantially perpendicular to the first engagement surface 84 with the demolition tool (not shown) at initiation of a demolition operation with the jaws (not shown) fully open.

FIG. 5 illustrates a view of the replaceable tip 10 from a direction B where a non-contact edge 75 is shown joining base 68. FIG. 6 illustrates a view of the replaceable tip 10 from a direction C where the first engagement surface 84 is adjacent to the base 68 in a transverse direction.

Figure 7:
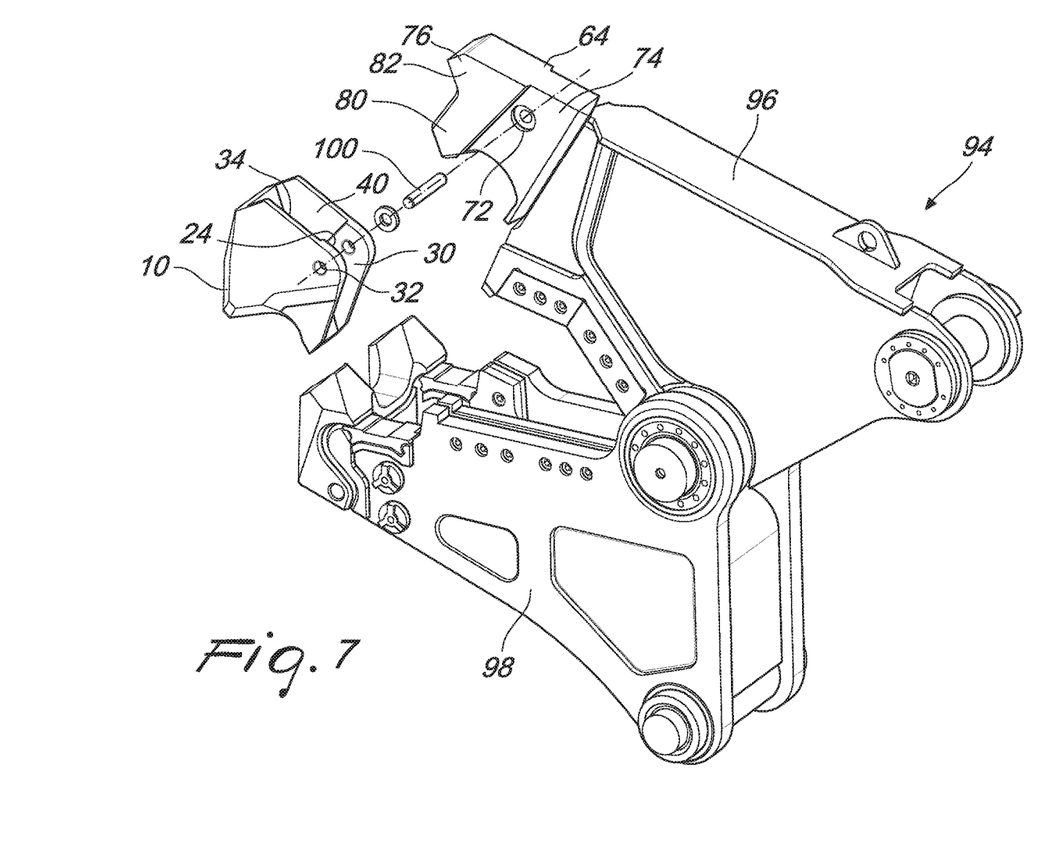
FIG. 7 is a first exploded view of a replaceable tip for coupling to an adapter of a demolition tool according to the present disclosure.
Figure 8:
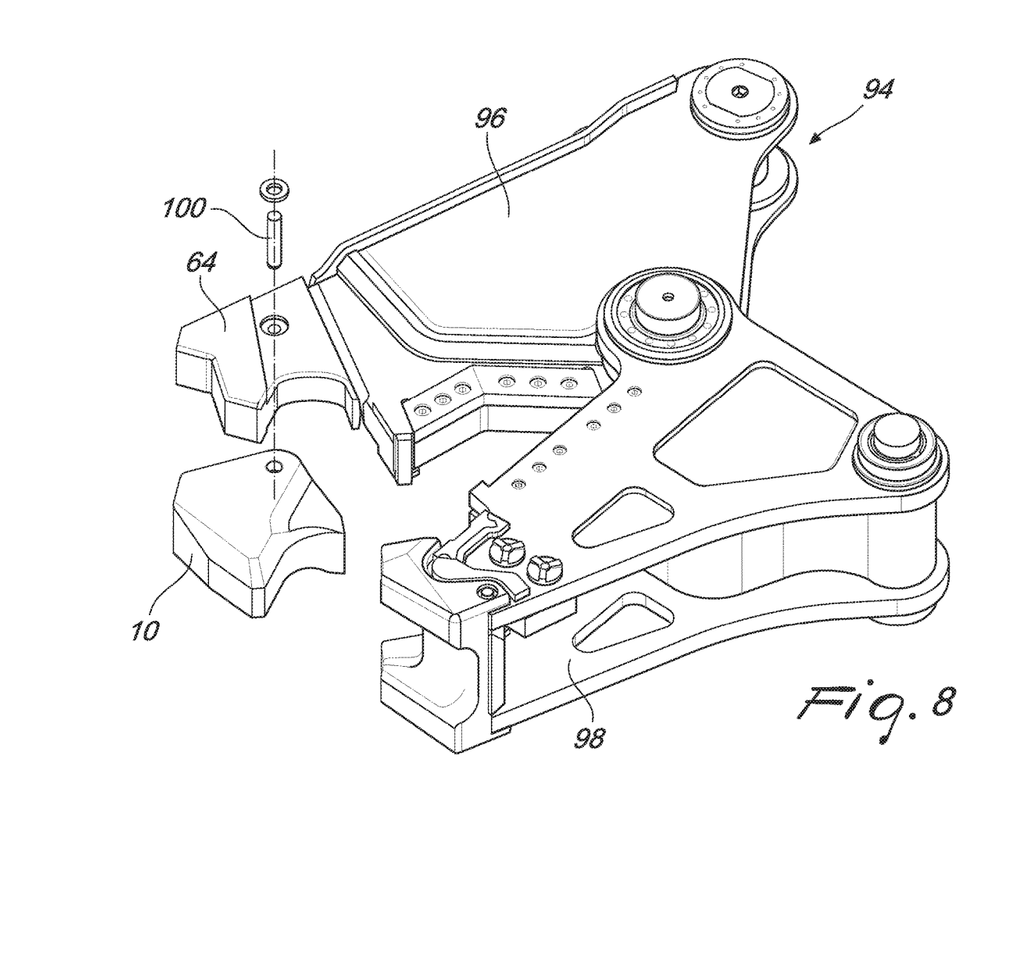
FIG. 8 is a second exploded view of a replaceable tip for coupling to an adapter of a demolition tool according to the present disclosure.

FIGS. 7 and 8 illustrate the replaceable tip 10 and a part of the demolition tool 94. The demolition tool 94 may have a first jaw 96, a second jaw 98 and a cylinder (not shown) to actuate the first jaw 96 and the second jaw 98. In an embodiment, the adapter 64 may be provided on first jaw 96. The adapter 64 may be provided at the distal end of the demolition tool 94. The first jaw 96 may be an upper jaw and the second jaw 98 may be a lower jaw.

The replaceable tip 10 may be coupled to the adapter 64 by a pin 100. The pin 100 may be inserted through the reciprocal securing portion 72. Replaceable tip 10 may be oriented to receive the projection 80 and the shoulder 82 of the adapter 64 into the channel 60.

Figure 9:
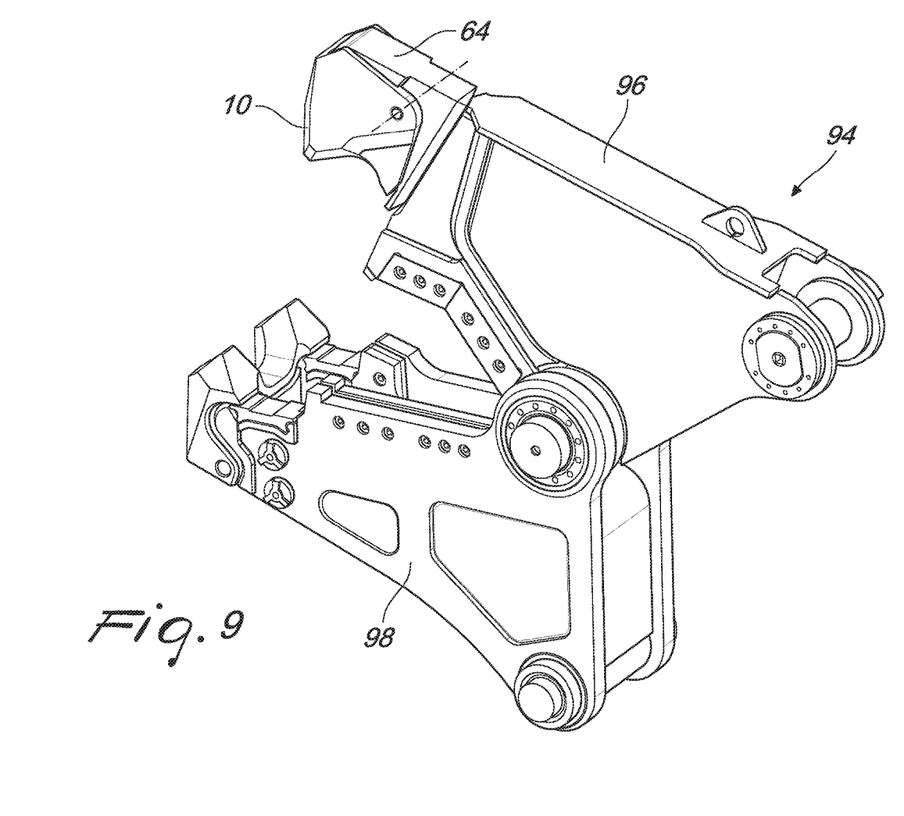
FIG. 9 is an isometric view of the replaceable tip coupled to the adapter according to the present disclosure.
Figure 10:
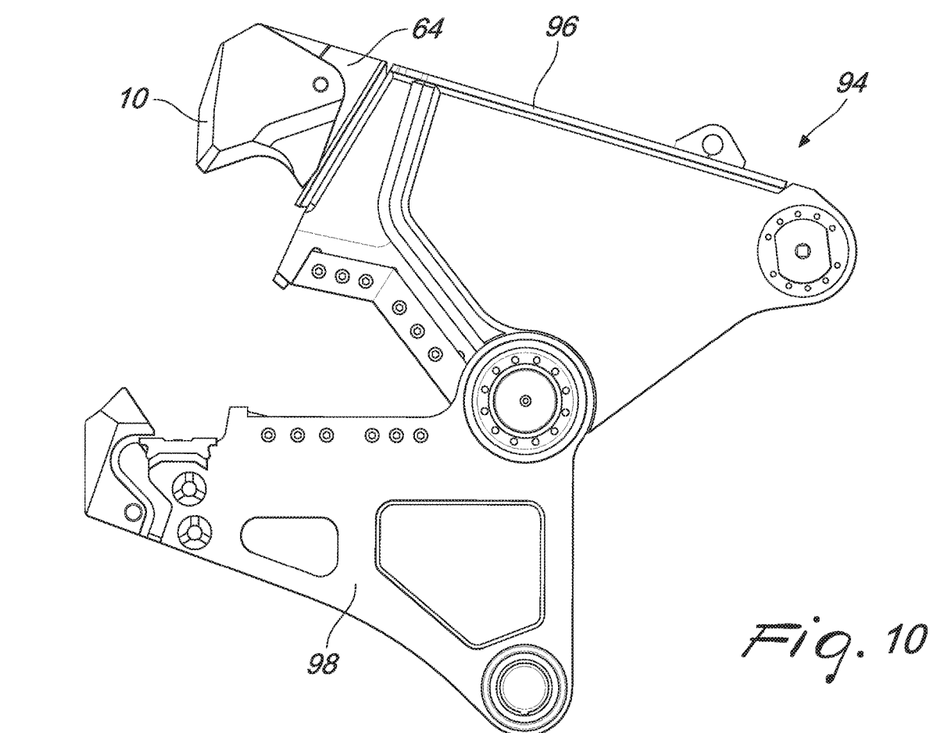
FIG. 10 is an isometric view of the replaceable tip coupled to the adapter according to the present disclosure.

FIGS. 9 and 10 illustrate the replaceable tip 10 on the adapter 64. Replaceable tip 10 may cover the support sides 70 and the central side 78 of the adapter 64.

Figure 11:
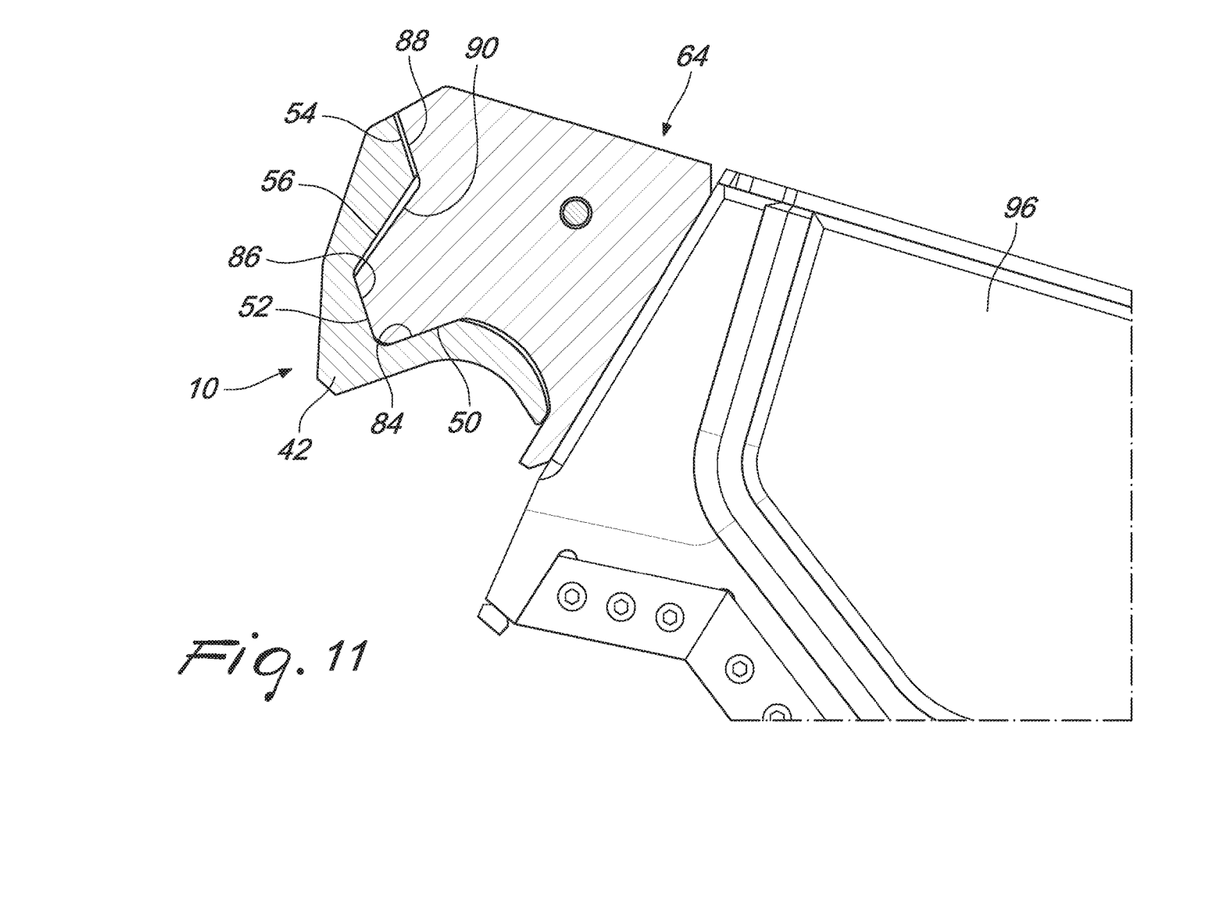
FIG. 11 is a sectional view of a replaceable tip coupled to an adapter mounted to a demolition tool according to the present disclosure.

FIG. 11 illustrates a sectional view of the replaceable tip 10 on the adapter 64. First abutment surface 50 may be in constant contact with the first engagement surface 84. In an embodiment, second abutment surface 52 may be in contact with the second engagement surface 86. Third abutment surface 54 may be spaced from the third engagement surface 88.

In an alternative embodiment, second abutment surface 52 may be spaced from the second engagement surface 86. Third abutment surface 54 may be in contact with the third engagement surface 88.

Figure 12:
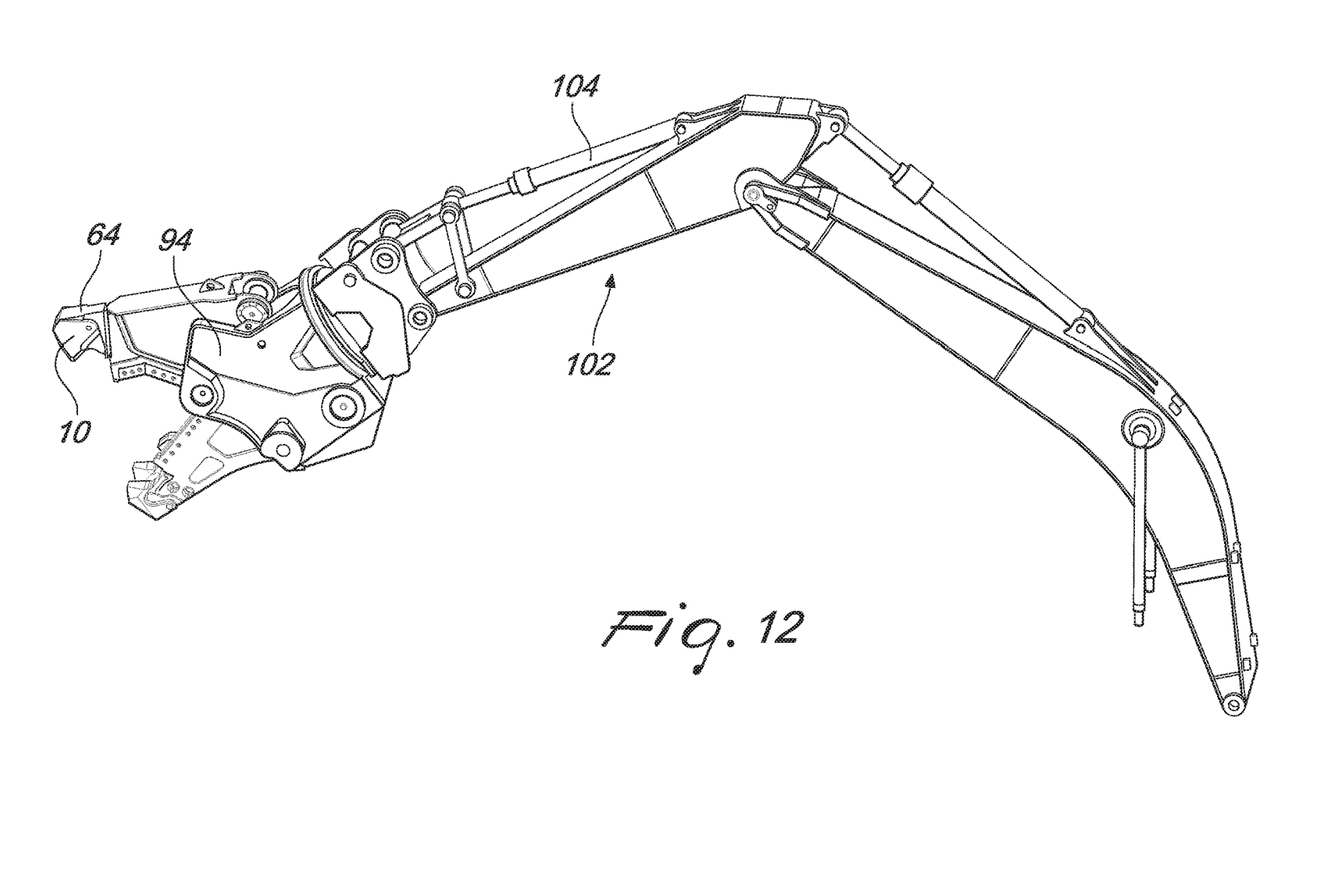
FIG. 12 is an isometric view of a replaceable tip coupled to an adapter mounted to a demolition tool coupled to a machine arm according to the present disclosure.

FIG. 12 illustrates the demolition tool 94 connected to the machine arm 102 having a bucket cylinder 104.

The replaceable tip 10 may prevent wear on the adapter 64 mounted on the demolition tool 94. The method may comprise the steps of providing the replaceable tip 10; coupling the replaceable tip 10 to the adapter 64 comprising a body 66 having a central side 78, the central side 78 having first, second and third engagement surfaces 84, 86, 88 wherein the central side 78 extends longitudinally from a base 68 to an apex 83, wherein the first abutment surface 50 force engages the first engagement surface 84; and closing jaws 96, 98 of the demolition tool 94 to crush work material such that the resultant demolition force is directed to the adapter 64 in a direction perpendicular to the first abutment surface 50. The second abutment surface 52 may force engage the second engagement surface 86 or the third abutment surface 54 may force engage the third engagement surfaces 88.

Closing of the jaws 96, 98 may be initiated when the jaws 96, 98 are at a fully opened position. The jaws 96, 98 may be at limit of opening. The jaws 96, 98 may be under a load. The jaws 96, 98 may be under further hydraulic pressure from the bucket cylinder 104. The hydraulic pressure may result in force engagement of the first abutment surface 50 force engages the first engagement surface 84. The hydraulic pressure may result in force engagement of either the force engagement of the second abutment surface 52 and the second engagement surface 86 or the force engagement of the third abutment surface 54 and the third engagement surfaces 88.

The skilled person would appreciate that foregoing embodiments may be modified or combined to obtain the replaceable tip 10 of the present disclosure.

INDUSTRIAL APPLICABILITY

This disclosure describes a replaceable tip 10. The replaceable tip 10 may be mounted to the jaw set of a demolition tool 94 such as multiprocessors, pulverizers, crushers and other demolition tools that may have a jawset or grapple tine which have closing movements. The replaceable tip 10 may be mounted to an adapter 64 of the first jaw 96 or the second jaw 98. The replaceable tip 10 may shield the adapter 64 from wear during demolition operations such as crushing or cutting of materials. The replaceable tip 10 may be made of materials suitable for the crushing or cutting operations.

The replaceable tip 10 may be easily and efficiently mounted on and dismounted from the adapter 64. Once the replaceable tip 10 is worn out due to work operations of the demolition tool, the replaceable tip 10 may be easily replaced with a substitute replaceable tip 10. The replaceable tip 10 may reduce failure in the adapter 64 as a result of plastic deformation caused by an excessive load.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realize the disclosure may be embodied in other specific forms without departing from the disclosure or essential characteristics thereof. The foregoing embodiments are therefore to be considered in all respects illustrative rather than limiting of the disclosure described herein. Scope of the disclosed embodiments is thus indicated by the appended claims, rather than the foregoing description, and all changes that come within the meaning and range of equivalence of the claims are therefore intended to be embraced therein.

The invention claimed is:

1. A replaceable tip for a demolition tool, the replaceable tip comprising:
a first sidewall having a first contact side;
a second sidewall having a second contact side; and
a center wall connecting the first sidewall and the second sidewall, the center wall having a third contact side provided with a recess, the recess having first and second abutment surfaces and the third contact side having a third abutment surface adjacent the recess, wherein the recess has a non-contact surface connecting the second abutment surface to the third abutment surface; and
a channel defined by the first, second and third contact sides, the channel being configured to receive an adapter of the demolition tool.

2. The replaceable tip according to claim 1, wherein the first, second and third abutment surfaces are aligned along a longitudinal axis of the channel.

3. The replaceable tip according to claim 2, wherein the first abutment surface is inclined relative to the second abutment surface.

4. The replaceable tip according to claim 2, wherein the first abutment surface is configured so as to transfer a resultant demolition force to the adapter in a direction perpendicular to the first abutment surface.

5. The replaceable tip according to claim 1, wherein the first abutment surface is adjacent to the second abutment surface.

6. The replaceable tip according to claim 5, wherein the first abutment surface is substantially perpendicular to the second abutment surface.

7. The replaceable tip according to claim 5, wherein the first abutment surface is configured so as to transfer a resultant demolition force to the adapter in a direction perpendicular to the first abutment surface.

8. The replaceable tip according to claim 1, wherein the first abutment surface is configured so as to transfer a resultant demolition force to the adapter in a direction perpendicular to the first abutment surface.

9. The replaceable tip according to claim 8, wherein the first abutment surface is configured to act alternatively with the second abutment surface or the third abutment surface for the transfer of the resultant demolition force to the adapter in a direction perpendicular to the first abutment surface.

10. A demolition tool comprising:
an adapter mounted on a jaw;
a replaceable tip according to claim 1, wherein the replaceable tip is coupled to the adapter.

11. The demolition tool of claim 10, wherein the adapter comprises a body having a central side, the central side having first, second and third engagement surfaces wherein the central side extends longitudinally from a base to an apex.

12. The demolition tool of claim 11, wherein the adapter has a projection extending substantially transversally from the body, the first and second engagement surfaces being provided on the projection.

13. The demolition tool of claim 12, wherein the adapter has a shoulder extending substantially longitudinally from the body and being adjacent to the projection wherein the third engagement surface is provided on the shoulder.

14. A method of preventing wear on an adapter mounted on a demolition tool, the method comprising the steps of:
providing a replaceable tip according to claim 1;
coupling the replaceable tip to the adapter comprising a body having a central side, the central side having first, second and third engagement surfaces wherein the central side extends longitudinally from a base to an apex, wherein the first abutment surface force engages the first engagement surface; and
closing jaws of the demolition tool to crush work material such that the resultant demolition force is directed to the adapter in a direction perpendicular to the first abutment surface.

15. The method of claim 14, wherein the second abutment surface force engages the second engagement surface or the third abutment surface force engages the third engagement surface.

16. The method of claim 14, wherein closing jaws is initiated when the jaws are at a fully opened position by hydraulic pressure in a hydraulic cylinder in the demolition tool.

17. The method of claim 15, wherein closing jaws is initiated when the jaws are at a fully opened position by hydraulic pressure in a hydraulic cylinder in the demolition tool.

* * * * *